United States Patent [19]

Minart

[11] 4,402,578

[45] Sep. 6, 1983

[54] SPECTACLE FRAME WITH REMOVABLE LENS HOLDER

[75] Inventor: François Minart, Saint Germain en Laye, France

[73] Assignee: Essilor International, cie Generale d'Optique, Cretell, France

[21] Appl. No.: 281,416

[22] Filed: Jul. 8, 1981

[30] Foreign Application Priority Data

Aug. 12, 1980 [FR] France .................. 80 17730

[51] Int. Cl.³ .................. G02C 5/00; G03B 23/00
[52] U.S. Cl. .................. 351/140; 351/124; 351/133
[58] Field of Search .......... 351/125, 98, 92, 124, 351/133, 134, 135, 140, 150, 105, 149; 2/442, 443

[56] References Cited
FOREIGN PATENT DOCUMENTS 1428549 1/1966 France .
2094810 2/1972 France .

Primary Examiner—John K. Corbin
Assistant Examiner—Rodney B. Bovernick
Attorney, Agent, or Firm—Charles E. Brown

[57] ABSTRACT

A spectacle frame comprises a crossbar and a removable lens holder comprising a central bridge, side pieces joined by the bridge retaining respective lenses. The bridge mates with a central section of the crossbar to removably attach the lens holder to the crossbar. The bridge comprises two branches curved in opposite senses, substantially in alignment with the side pieces, to constitute as plane closed loop. The branches of the bridge carry resilient retaining clips which engage cooperating edge portions of the central section of the crossbar.

The central section comprises two branches curved in opposite senses and joined together to constitute a substantially plane closed loop analogous to and superposable on the closed loop formed by the curved branches of the bridge.

8 Claims, 11 Drawing Figures

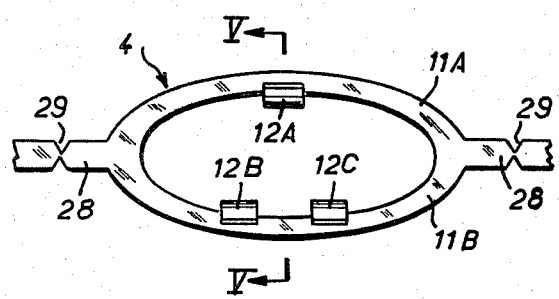
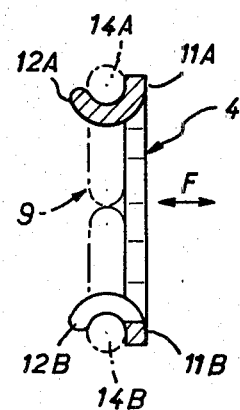
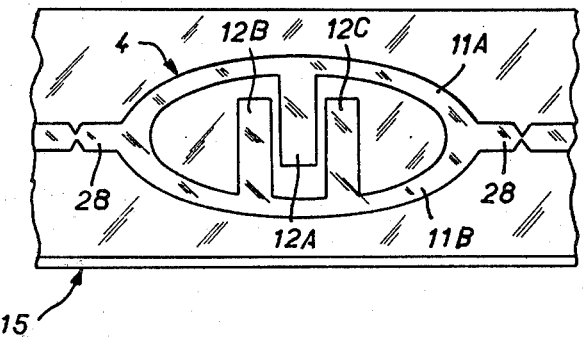
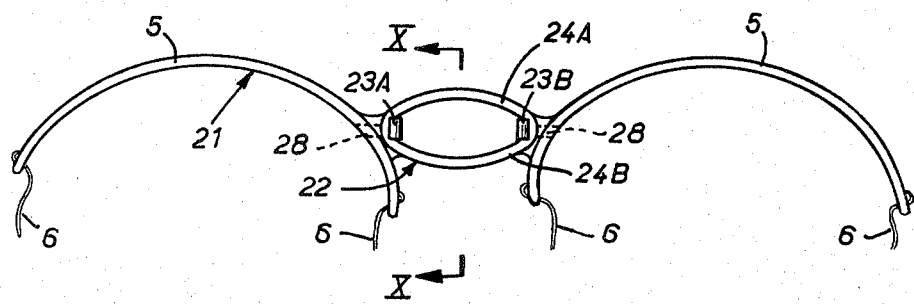

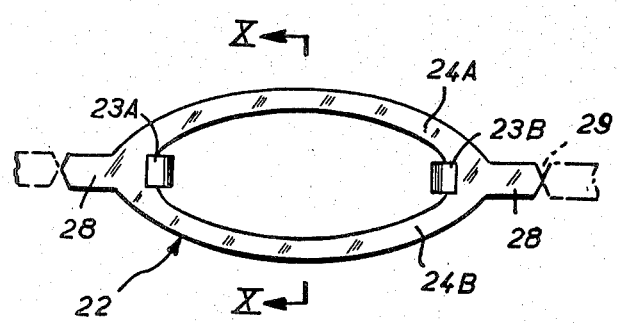
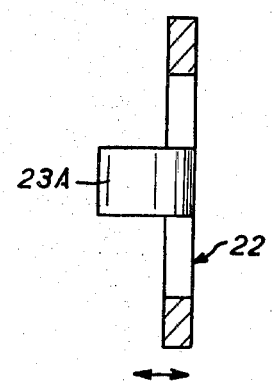
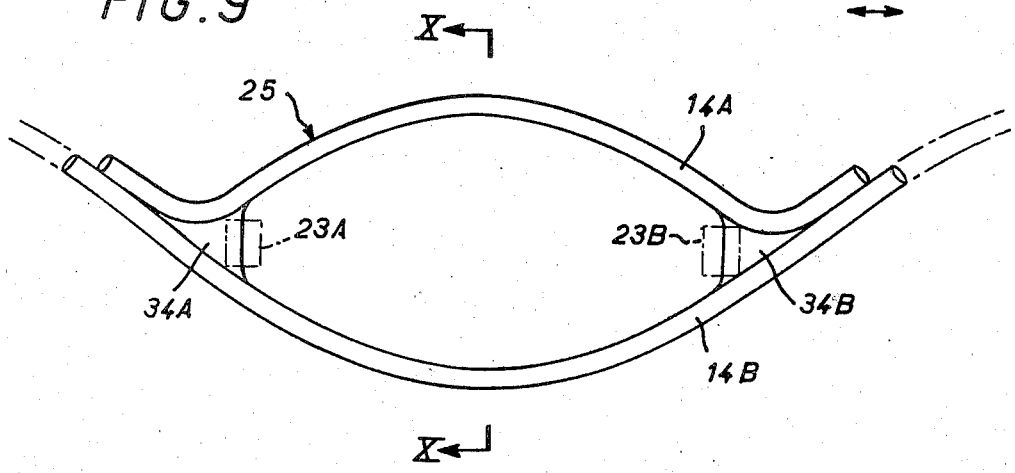
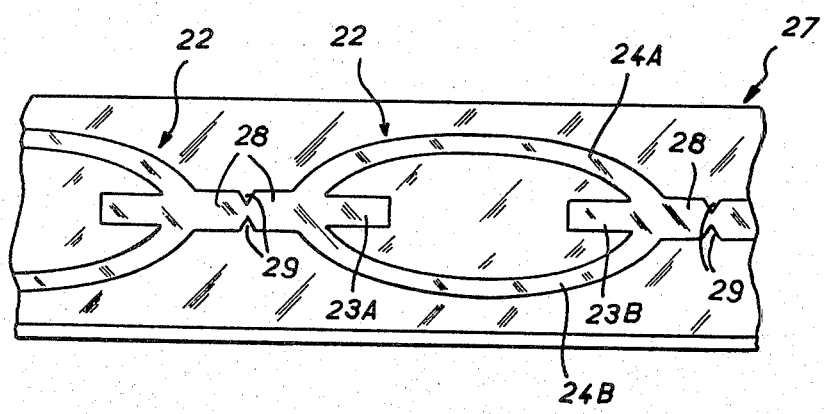

SPECTACLE FRAME WITH REMOVABLE LENS HOLDER

BACKGROUND OF THE INVENTION

1. Field of the Invention

The present invention concerns a spectacle frame comprising a crossbar, respective wings symmetrically pivoted to the opposite ends of said crossbar, and a removable lens holder carried by said crossbar. The lens holder comprises a central bridge, symmetrically disposed side pieces joined by said central bridge and means on said side pieces for retaining respective lenses. Each of said side pieces of said lens holder is designed to mate with a corresponding side section of said crossbar when said lens holder is mounted thereon. The central bridge of said lens holder is designed to mate with a corresponding central section of said crossbar when said lens holder is mounted thereon, so as to removably attach said lens holder to said crossbar.

2. Description of the Prior Art

Various designs of spectacle frame of this type are known in the art, in particular through the disclosure of French patent application No. 80 03466 of Feb. 18, 1980 in the name ESSILOR INTERNATIONAL, which discloses for the central bridge of the lens holder my invention for a system of two parallel crosspieces designed to clock into two parallel slots on a corresponding retaining tab on the crossbar. Priority from the French patent application No. 80 03466 has been claimed in my copending U.S. application Ser. No. 233,566 filed Feb. 2, 1981.

While this design gives good results, its aesthetic appearance is not appreciated by all users, especially female users. Also, the retaining tab on the crossbar is of moulded plastics material and is somewhat difficult to clean for the user and has a relatively limites service life.

The object of the invention is to provide a removable lens holder spectacle frame of the aforementioned type which is easy to manufacture and easy to clean in use while offering a good service life and a more restrained aesthetic appearance, through the elimination of the retaining tab on the crossbar and the two parallel crosspieces on the bridge.

SUMMARY OF THE INVENTION

The invention consists in a spectacle frame comprising a crossbar, respective wings symmetrically pivoted to the opposite ends of said crossbar, and a removable lens holder carried by said crossbar, said lens holder comprising a central bridge, symmetrically disposed side pieces joined by said central bridge and means on said side pieces for retaining respective lenses, each of said side pieces of said lens holder being designed to mate with a corresponding side section of said crossbar when said lens holder is mounted thereon and said central bridge of said lens holder being designed to mate with a corresponding central section of said crossbar when said lens holder is mounted thereon so as to removably attach said lens holder to said crossbar, said central bridge of said lens holder comprising two branches curved in opposite senses, substantially in alignment with said side pieces of said lens holder and joined together at their respective opposite ends to constitute a substantially plane closed loop, said central bridge of said lens holder carrying at least two resilient retaining clips disposed transversely of said substantially plane loop, and each retaining clip being designed to engage and resiliently retain a co-operating edge portion of said central section of said crossbar so as to removably attach said lens holder to said crossbar.

As will be further explained in the following description, the special features of the spectacle frame in accordance with the invention, as defined above, facilitate industrial production in that the removable attachment system for the lens holder comprises only metal components. It is relatively simple to fabricate these components in such a way as to satisfy users' requirements, in particular through the use of rods of small diameter or blanks cut from a sheet of copper alloy and formed in a press. Such components are easy to assemble, in particular by brazing or welding, and offer good aesthetic appearance and long service life, also being easy to clean.

The central section of the crossbar which mates with the bridge of the lens holder preferably comprises two branches curved in opposite senses and joined together at their respective opposite ends to constitute a substantially plane closed loop analogous to and superposable on the closed loop formed by the curved branches of the central bridge of the lens holder.

One of the curved branches of the central bridge preferably carries a first resilient retaining clip which is substantially co-planar with the plane of symmetry of the lens holder, the other of the curved branches of the central bridge carrying two further resilient retaining clips which are disposed on opposite sides of the aforementioned plane of symmetry, all three retaining clips having curved end portions which may be engaged between the branches of the central section of the crossbar so that the first clip bears resiliently on the first of the branches along a first direction and the two further clips bear resiliently on the other branch along the direction opposite to the first direction so as to removably attach the central bridge of the lens holder to the central section of the crossbar.

These arrangements simplify and facilitate industrial manufacture of the spectacle frame in accordance with the invention, as will be further explained later.

In an alternative embodiment, the central bridge of the lens holder carries two retaining clips which are located at points substantially coincident with respective intersections of the curved branches of the central bridge, these retaining clips having curved end portions which co-operate with respective edge portions of central areas of retaining plates, these edge portions being substantially parallel to the plane of symmetry of the crossbar.

By engaging the curved end portions of the two retaining clips with the edges of the respective retaining plates, parallel to the plane of symmetry of the crossbar and located on opposite sides of that plane of symmetry, accurate relative positioning of the crossbar and the lens holder in the direction transverse to their respective planes of symmetry is ensured.

The central bridge of the lens holder is preferably formed with integral retaining clips by cutting it out from sheet metal.

Other objects and advantages will appear from the following description of an example of the invention, when considered in connection with the accompanying drawings, and the novel features will be particularly pointed out in the appended claims.

BRIEF DESCRIPTION OF THE DRAWINGS

FIG. 4 is a front view to a larger scale of the central bridge of the lens holder shown in FIG. 3.

FIG. 5 is a cross-section on the line V—V in FIG. 4, showing the bridge of the removable lens holder assembled with the corresponding central section of the crossbar of the spectacle frame shown in FIGS. 1 and 2.

FIG. 6 shows the blank to be cut from sheet metal in order to fabricate the bridge shown in FIG. 4, with its two curved branches and three retaining clips integral with respective branches.

FIG. 7 is a view analogous to FIG. 3 and showing an alternative version of the removable lens holder for a spectacle frame in accordance with the invention.

FIG. 8 is a view analogous to FIG. 4, being a front view to a larger scale of the central bridge of the lens holder shown in FIG. 7.

FIG. 9 is a schematic front view of the central section of a version of the crossbar corresponding to the bridge shown in FIG. 8.

FIG. 10 is a view analogous to FIG. 5, being a cross-section on the line X—X in FIG. 8, showing this version of the bridge assembled with the corresponding central section of the crossbar shown in FIG. 9.

FIG. 11 is a view analogous to FIG. 6, showing the blank to be cut from sheet metal in order to fabricate the bridge shown in FIG. 8 with its two curved branches and two retaining clips integral therewith.

DESCRIPTION OF THE PREFERRED EMBODIMENTS

Figure 1:
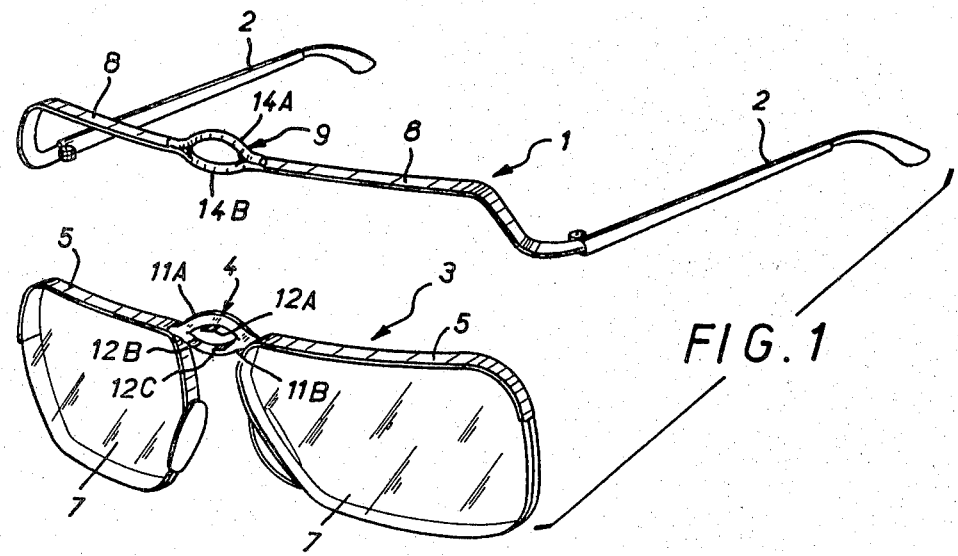
FIG. 1 is an exploded view in perspective showing the crossbar with the two wings pivoted thereto and the removable lens holder of a spectacle frame in accordance with the invention.
Figure 2:
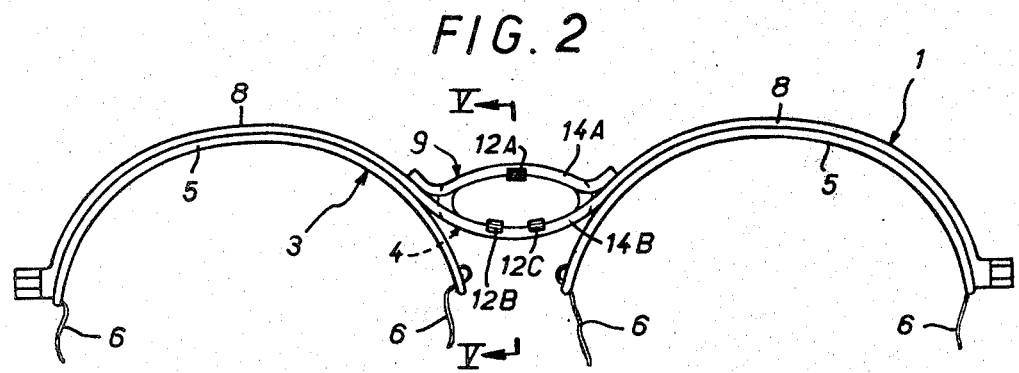
FIG. 2 is a front view of the spectacle frame shown in FIG. 1, to a larger scale, showing the crossbar and removable lens holder attached together.

Referring to FIGS. 1 to 6, the spectacle frame comprises a supporting crossbar 1 with respective wings 2 symmetrically pivoted to opposite ends of crossbar 1. A removable lens holder 3 comprises a central bridge 4 and symmetrically disposed side pieces 5 (FIG. 3) joined by bridge 4 with means such as flexible ties 6 on each side piece 5 for retaining a respective lens 7 (FIG. 1). Eeach of side pieces 5 is designed to mate with a corresponding side section 8 of crossbar 1 when the lens holder is mounted on the crossbar (FIGS. 1 and 2). Central bridge 4 of lens holder 3 is designed to mate with a corresponding central section of crossbar 1 when the lens holder is mounted thereon so as to removably attach the lens holder to the crossbar.

Thus, as can be seen in FIGS. 1, 2 and 5, it is convenient for bridge 4 of the lens holder to be located in front of the corresponding central section 9 of the crossbar in the assembled position, as will be described in more detail later.

Central bridge 4 of lens holder 3 comprises two branches 11A, 11B curved in opposite senses, substantially in alignment with side pieces 5 of the lens holder (FIGS. 1 and 3) which are joined together by bridge 4. Curved branches 11A, 11B are joined together to constitute a substantially plane closed loop. The upper branch 11A of bridge 4 carries a resilient retaining clip 12A substantially perpendicular to the plane of the aforementioned closed loop formed by the two curved branches 11A, 11B. The lower branch 11B of the bridge carries two similar retaining clips 12B, 12C substantially parallel to the first retaining clip 12A. Each retaining clip 12A, 12B, 12C is designed to engage and resiliently retain a co-operating edge portion of the central section 9 of the crossbar so as to removably attach lens holder 3 to crossbar 1.

Central section 9 of crossbar 1 (FIGS. 1 and 2) preferably comprises two branches 14A, 14B curved in opposite senses and joined together at their respective opposite ends to constitute a substantially plane closed loop analogous to and superposable on the closed loop formed by curved branches 11A, 11B of bridge 4 of lens holder 3.

Figure 3:
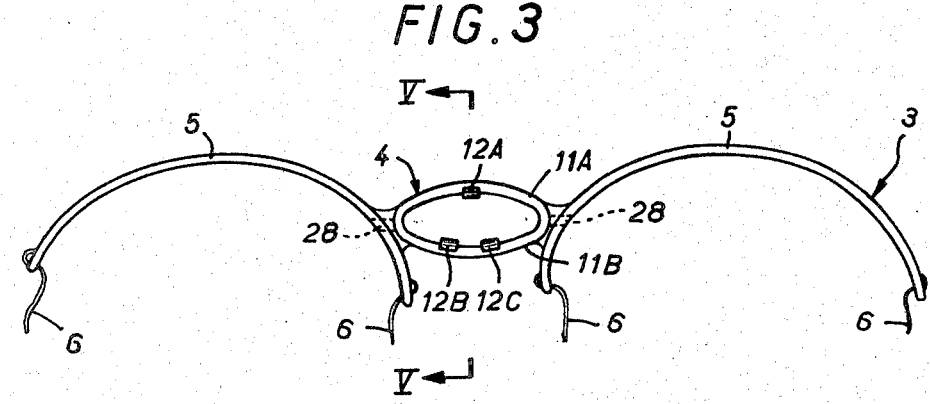
FIG. 3 is a view analogous to FIG. 2, showing the lens holder separated from the crossbar.

In this example, retaining clip 12A integral with upper curved branch 11A of bridge 4 (FIGS. 3 and 4) is disposed in the plane of symmetry of the lens holder, corresponding to the section line V—V in FIG. 3. The other retaining clips 12B, 12C integral with lower curved branch 11B are symmetrically disposed relative to the plane of symmetry of lens holder 3. All three retaining clips 12A, 12B, 12C have curved end portions which may be engaged between curved branches 14A, 14B of central section 9 of crossbar 1 (FIG. 5) so that each bears resiliently against one of branches 14. In the embodiment shown in FIGS. 1 to 5 the curved end portion of upper retaining clip 12A bears in the outward direction on curved branch 14A of central section 9 of the crossbar while the curved end portions of lower retaining clips 12B, 12C bear in the downward direction on lower curved branch 14B of central section 9 of crossbar 1.

As shown schematically in FIG. 6, central bridge 4 of lens holder 3 (FIG. 3) may be advantageously fabricated by cutting it out from a metal sheet 15, of a stainless copper alloy, for example, the metal being of appropriate elasticity, easy to shape and easy to polish to obtain a durable finish of pleasing aesthetic appearance. Bridge 4 may thus be fabricated as a single component with its three integral retaining clips 12A, 12B, 12C.

The use and advantages of the spectacle frame in accordance with the invention as described with reference to FIGS. 1 to 6 will now be discussed.

To assemble lens holder 3 and crossbar 1, with pivoted wings 2 substantially horizontal (for example), lens holder 3 is held in a substantially vertical position as shown in FIG. 1. In this position retaining clips 12A, 12B, 12C of central bridge 4 of the lens holder are engaged between the oppositely curved branches 14A, 14B of central section 9 of crossbar 1, the retaining clips being pressed rearwardly relative to central section 9, as indicated by the lefthand-facing arrow F in FIG. 5. Slight pressure is sufficient to overcome the elasticity of clips 12A, 12B, 12C so as to fully engage their curved end portions on the oppositely curved branches 14A, 14B of central section 9, in the position as shown in FIGS. 2 and 5. Bridge 4 is then clamped directly in front of central section 9 of the crossbar and the analogous profiles of bridge 4 and central section 9 are substantially superposed (FIG. 2).

The elasticity of retaining clips 12A, 12B, 12C is sufficient to maintain bridge 4 of lens holder 3 and central section 9 of crossbar 1 in the assembled position. To separate lens holder 3 from crossbar 1, in order to clean the spectacle frame or to fit an alternative interchangeable lens holder 3, for example, it is only necessary to pull bridge 4 in the forward direction relative to central section 9 of the crossbar, as indicated by the righthand-facing arrow F in FIG. 5. The elasticity of retaining clips 12A, 12B, 12C enables the curved end portions of these clips to deform sufficiently to disengage from the respective retaining edge of curved branch 14A or 14B of central section 9 of crossbar 1.

It will be understood that various changes in the details, material and arrangement of parts, which have been herein described and illustrated in order to explain the nature of the invention, may be made by those skilled in the art within the principle and scope of the invention as expressed in the appended claims. Examples of such modifications will now be described.

MODIFICATIONS

FIGS. 7 to 11 show a modified lens holder 21 analogous to lens holder 3 as shown in FIGS. 1 to 6 and comprising a central bridge 22 analogous to bridge 4 as already described. Bridge 22 carries two retaining clips 23A, 23B located at respective intersections of two curved branches 24A, 24B of bridge 22, on either side of the bridge (FIG. 8). Retaining clips 23A, 23B have curved end portions analogous to those of retaining clips 12A, 12B, 12C (FIGS. 2 to 6). The end portions of clips 23A, 23B co-operate with edge portions of respective retaining plates 34A 34B on the central section 25 of the crossbar, analogous to central section 9 of crossbar 1 as shown in FIG. 1. Each edge portion of retaining plates 34A, 34B is substantially parallel to the plane of symmetry of the crossbar, corresponding to section line X—X in FIGS. 8 and 9.

As shown schematically in FIG. 8, the two retaining clips 23A, 23B are disposed symmetrically relative to the plane of symmetry of the lens holder, corresponding to section line X—X. When engaged with the edge portions of retaining plates 34A, 34B retaining clips 23A, 23B thus automatically ensure exact coincidence of the plane of symmetry of bridge 22 with the plane of symmetry of the central section 25 of the crossbar. Thus the lens holder and crossbar are accurately and permanently positioned relative to one another in the direction transverse to their respective planes of symmetry.

FIG. 11 is a view analogous to FIG. 6 showing the blank to be cut from metal sheet 27 to fabricate bridge 22 as shown in FIG. 8, as a single component with integral retaining clips 23A, 23B. Metal sheet 27 may comprise, for example, a tape whose width slightly exceeds the height of bridge 22, from which bridges are mass-produced. By executing a number of consecutive passes using appropriate tools the curved end portions of retaining clips 23A, 23B may be economically and accurately formed, after cutting out in the flat and integral with the oppositely curved branches 24A, 24B of the respective bridge 22. The bridges 22 mass-produced in this way may advantageously be joined together in a continuous strip by means of connecting tongues 28 formed with notches 29 which make it easy to break tongues 28 to separate bridges 22, the tongues 28 on each bridge 22 then being used with advantage as reinforcements in attaching each end of bridge 22, by welding, for example, to the adjacent side section 5 of the lens holder, as represented schematically in FIGS. 3 and 7.

In a second modified embodiment (not shown in the drawings) five retaining clips 12A, 12B, 12C and 23A, 23B are associated with bridge 4.

Using five retaining clips ensures perfect centering of the lens holder relative to the assembled frame through the exact superposition of bridge 22 and the associated central section 25 of the crossbar.

I claim:

1. A spectacle frame comprising a crossbar, respective wings symmetrically pivoted to the opposite ends of said crossbar, and a removable lens holder carried by said crossbar, said lens holder comprising a central bridge, symmetrically disposed side pieces joined by said central bridge and means on said side pieces for retaining respective lenses, each of said side pieces of said lens holder being designed to mate with a corresponding side section of said crossbar when said lens holder is mounted thereon and said central bridge of said lens holder being designed to mate with a corresponding central section of said crossbar when said lens holder is mounted thereon so as to removably attach said lens holder to said crossbar, said central bridge of said lens holder comprising two branches curved in opposite senses, substantially in alignment with said side pieces of said lens holder and joined together at their respective opposite ends to constitute a substantially plane closed loop, said central bridge of said lens holder carrying at least two resilient retaining clips disposed transversely of said substantially plane loop, and each retaining clip being designed to engage and resiliently retain a co-operating edge portion of said central section of said crossbar so as to removably attach said lens holder to said crossbar.

2. A spectacle frame according to claim 1, wherein said central section of said crossbar which mates with said bridge of said lens holder comprises two branches curved in opposite senses and joined together at their respective opposite ends to constitute a substantially plane closed loop analogous to and superposable on said closed loop formed by said curved branches of said central bridge of said lens holder.

3. A spectacle frame according to claim 1, wherein said lens holder has a plane of symmetry and one of said curved branches of said central bridge carries a first resilient retaining clip which is substantially co-planar with said plane of symmetry, the other of said curved branches of said central bridge carrying two further resilient retaining clips which are disposed on opposite sides of said plane of symmetry, all three retaining clips having curved end portions which may be engaged between said branches of said central section of said crossbar so that said first clip bears resiliently on a first of said branches along a first direction and said two further clips bear resiliently on the other of said branches along the direction opposite to said first direction so as to removably attach said central bridge of said holder to said central section of said crossbar.

4. A spectacle frame according to claim 3, wherein said central bridge of said holder is formed with integral retaining clips by cutting it out from sheet metal.

5. A spectacle frame according to claim 1, wherein said crossbar has a plane of symmetry and comprises retaining plates and said central bridge of said lens holder carries two retaining clips which are located at points substantially coincident with respective intersections of said curved branches of said central bridge, said retaining clips having curved end portions which co-operate with respective edge portions of central areas of said retaining plates, said edge portions being substantially parallel to said plane of symmetry of said crossbar.

6. A spectacle frame according to claim 5, wherein said central bridge of said lens holder is formed with integral retaining clips by cutting it out from sheet metal.

7. A spectacle frame according to claim 1, wherein said central bridge of said lens holder carries five retaining clips, two of which are located at points substantially coincident with respective intersections of said curved branches of said central bridge and the other three of which are located at points on said curved branches of said central bridge.

8. A spectacle frame according to claim 7, wherein said central bridge of said lens holder is formed with integral retaining clips by cutting it out from sheet metal.

* * * * *